Feb. 7, 1950          G. C. E. KEET          2,496,477
MULTIPLE AND ROTATABLE STAMP MILL
Filed Jan. 10, 1947
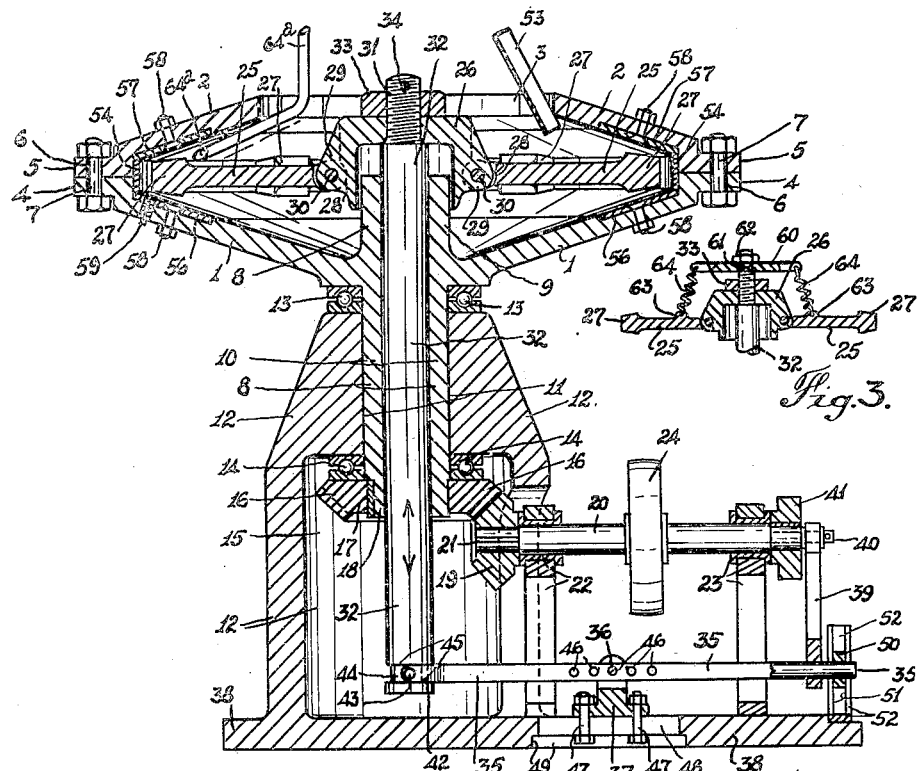
Fig. 3.
Fig. 1.
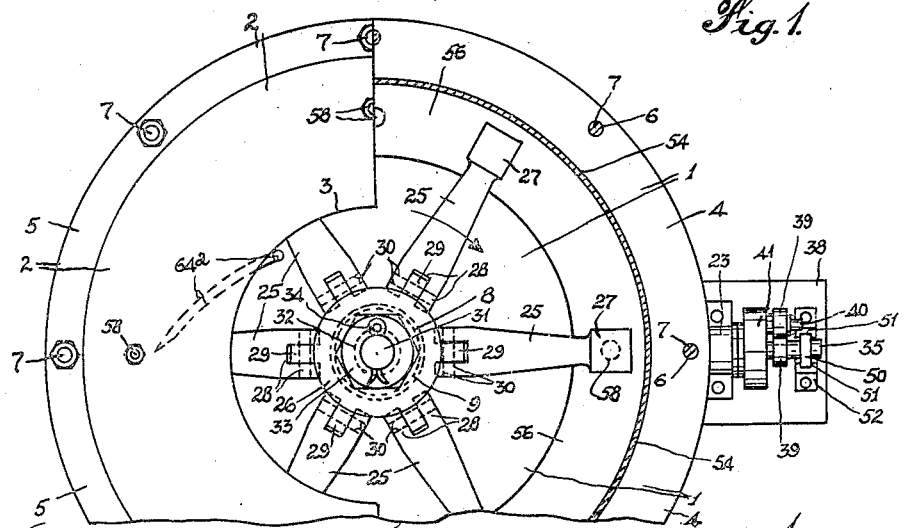
Fig. 2.
Witness: Arthur Thompson
Inventor: Gabriel Christiaan Erasmus Keet Patented Feb. 7, 1950

2,496,477

UNITED STATES PATENT OFFICE 2,496,477

MULTIPLE AND ROTATABLE STAMP MILL

Gabriel Christiaan Erasmus Keet, Florida,
Transvaal, Union of South Africa

Application January 10, 1947, Serial No. 721,180
In Union of South Africa July 8, 1946

6 Claims. (Cl. 241—205)

This invention relates to means for reducing or crushing rock, minerals, and other substances or materials.

The object of the invention is to design and construct an improved centrifugal multiple stamp mill which, due to the speed at which it can be driven and its positive multiple stamp crushing action, will operate to crush or reduce a large quantity of the material being acted upon in a comparatively short period of time.

The means or machine according to the invention includes a pan or vessel adapted to be rotated at a suitable high speed, a plurality of crushing elements arranged within said pan or vessel and rotatable by frictional contact with the material in the pan, or independently of the pan say at a different speed thereto, about a preferably vertical axis, and toggle means for operating said crushing elements to reduce or crush the rock, mineral, or other material between said elements and the internal wall of the pan or vessel.

The pan or receptacle may include a lower dished or hollow portion of inverted cylindro-conical internal shape, the underside of which is provided with a hollow shaft or cylindrical extension, and an upper dished or hollow portion of cylindro-conical internal shape and formed with a large central opening. The lower and upper portions of the pan or receptacle may be suitably connected together, or, if preferred, could be made in one piece. The pan or vessel may be continuously rotated through the medium of the hollow shaft or extension.

The crushing elements may be hingedly connected to a central member fixed to a vertically arranged central shaft and means be provided to reciprocate said vertical shaft to impart, by toggle action, radial movement to the crushing elements to cause them to crush or reduce the material between them and the internal wall of the pan or vessel.

The crushing elements may be of wedge shape in their outer end portions and be attached to or integral with suitable rods or stems by which they are hingedly connected to the central member.

The toggle action imparted to the wedge-shaped crushing elements causes them to move alternately upwards and downwards to crush the rock between them and the upper and lower faces of the internal wall of the pan, as well as to move outwardly to exert substantially horizontal crushing pressure.

If desired spring or resilient means may be provided for supporting the crushing elements from the central shaft when starting the machine, or until contact with the material in the rotating pan or vessel, or centrifugal force, acts to support them.

The invention will be more fully described with the aid of the accompanying drawings, wherein a practical embodiment of the same is shown;

Fig. 1 being a sectional elevation of the improved crushing or reducing means;

Fig. 2 a part plan of Fig. 1, with the upper portion of the pan or vessel removed at the right hand side thereof, the hollow cylindrical wall lining being shown in section; and Fig. 3 a detail sectional elevation illustrating spring means for resiliently supporting the crushing elements from the central shaft.

In the drawings the crushing pan or vessel includes the lower dished or hollow portion 1, of inverted cylindro-conical shape interiorly, and the upper hollow or dished portion 2 of cylindro-conical shape internally, and formed with a large central opening 3. The portions 1 and 2 of the pan or vessel are each constructed with a rim flange 4, 5, respectively, in holes 6 in which are arranged the fixing bolts 7 by which the portions 1, 2, are attached.

The lower portion 1 of the pan or vessel is constructed with a central hollow part 8, which provides an upwardly extending cylindrical portion 9 within the pan, and a downwardly extending hollow shaft or cylindrical extension 10 through the medium of which the pan or vessel is rotated.

The hollow cylindrical shaft or extension 10 is journalled in a bearing 11 provided by a hollow supporting standard 12. 13 is a thrust bearing arranged around the cylindrical extension 10 between the bottom of the portion 1 of the pan and the standard 12, and 14 is a further thrust bearing arranged around the cylindrical extension 10 and between the upper surface of the hollow interior 15 of said standard 12 and a bevelled toothed wheel 16 fixed by a key 17 on a lower reduced portion 18 of the cylindrical extension 10.

The pan or vessel is adapted to be rotated at a suitable high speed through the medium of the bevelled wheel 16 by a bevelled pinion 19 meshing therewith, and fixed upon a driving shaft 20 by a key 21. The shaft 20 is journalled in bearings 22, 23, and is driven by a belt—not shown—through a driving pulley 24 fixed on said shaft 20.

25 are the crushing elements, six of which are shown extending radially from a central member 26, to which they are hingedly attached. The crushing elements 25 are fashioned at their outer ends with wedge-shaped or outwardly tapered crushing heads 27, and are bifurcated at their inner ends, as indicated at 28. The central member 26 is constructed with perforated lugs 29 to which the crushing elements 25 are hingedly connected by hinge pins 30 passing through the lugs 29 and coincident holes in the bifurcations 28. The central member 26 is screwed on to the upper screw-threaded end 31 of a vertical shaft 32, and is further fixed thereon by a nut 33 and split pin 34. The vertical shaft 32 is journalled in the hollow central portion 8 of the lower portion 1 of the pan, and is adapted to be reciprocated or have up-and-down movement imparted to it to cause the crushing elements 25 to be moved outwards and inwards with a toggle action to crush the material in the pan or vessel.

The means shown for reciprocating the shaft 32 comprises an actuating lever 35 fulcrumed on a pin 36 carried by a bracket 37 adjustably arranged upon the base 38 of the supporting standard 12. The lever 35 is operated by a crank or connecting rod 39 which at one end engages the lever 35 and at the other end is actuated by the crank pin 40 of a disc crank 41 mounted on the end of the driving shaft 20. The shaft-actuating lever 35 is bifurcated at its inner end, at 42, and screws 43 screwed in said bifurcation carry arcuate pads 44, which engage in an annular groove 45 in the lower end portion of the vertical shaft 32 and serve to impart the reciprocal motion of the lever 35 to said shaft 32. The lever 35 is formed with a number of holes 46, in any one of which the fulcrum pin 36 can engage, and the bracket 37 is adjustable upon the base 38 of the standard 12, so that the lever 35 can be adjusted by varying the position of the fulcrum pin 36 and consequent amount of movement of the bifurcated end 42 of the lever 35. 47 are bolts for fixing the bracket 37 to the base 38. In order to allow of adjustment of the position of the bracket 37, the fixing bolts 47 pass through a slot 48 in the base 38, and their heads are housed in an undercut recess 49 therein. The lever 35 is guided near its outer end to ensure its proper movement, and for this purpose a square block 50 is arranged on the lever 35 and caused to move in guideways 51 provided by a member or frame 52 fixed to the base 38.

Means in the form of a chute or launder 53 is provided for feeding the rock or other material to be crushed or reduced into the pan or vessel. Means is also provided for discharging the reduced product from the pan or vessel, and is shown in the form of a pipe 64a having an oblique end opening directed against the direction of rotation of the pan or vessel to receive the reduced material and associated liquid from the rotating pan and deliver it outside the latter. Means—not shown—may also be provided for leading water to the pan if wet crushing is to be effected therein. If the machine is used for dry crushing, the reduced material may be discharged by a blower, or by suction.

54 is an annular wearing liner for the cylindrical interior portion of the pan or vessel, and 56, 57, are annular wearing liners for portions of the interior of the conical portions of the lower and upper parts 1, 2, respectively, of the pan or vessel. The liners 56, 57, are bolted in position by countersunk bolts 58 passing through holes in the liners 56, 57, and portions 1, 2, of the pan or vessel.

59 is a screw plug screwed through the wall of the lower portion 1 of the pan and the lower liner 56, for use in cleaning out the pan.

In Fig. 3 I show means for resiliently supporting the crushing elements 25 from the central vertical shaft 32. These means include a spider arms member 60 having a square central bore which fits a squared upper extension 61 of the central shaft 32. The spider arms member 60 is retained in position on the shaft 32 by a nut 62 on the upper screw-threaded end of the shaft 32. To the spider arms 60 and to lugs 63 on the tops of the crushing elements 25 are attached tension springs 64 of such a strength that they will maintain the crushing elements 25 in a substantially horizontal position when inoperative, or before they have attained sufficient speed, due to centrifugal force by contact with the material in the pan or vessel, to assume and be retained in such a position.

What I claim as my invention and desire to protect by Letters Patent is:

1. A multiple and rotatable stamp mill for reducing or crushing rock and other materials, including a pan having a bottom portion and a peripheral wall, means for rotating said pan at a high speed about a vertical axis, a plurality of crushing elements radially arranged within the pan, extending outwardly to near the wall thereof and rotated by frictional contact with the material in the pan, a central vertically reciprocating element, means for reciprocating said central element, and means for pivotally connecting the crushing elements to the central vertically reciprocating element so that said pivots are reciprocated vertically and the outer and crushing ends of the crushing elements are moved inwards and outwards with a toggle crushing action to cause them to crush the material between them and the wall of the pan.

2. A multiple and rotatable stamp mill for reducing or crushing rock and other materials, including a pan comprising a lower dished portion of inverted cylindro-conical internal shape and an upper portion of cylindro-conical internal shape, means for rotating said pan at a high speed about a vertical axis, a plurality of crushing elements radially arranged within the pan, extending outwardly to near the wall thereof and rotated by frictional contact with the material in the pan, a central vertically reciprocating element, means for reciprocating said central element, and means for pivotally connecting the crushing elements to the central vertically reciprocating element so that said pivots are reciprocated vertically and the outer and crushing ends of the crushing elements are moved inwards and outwards with a toggle crushing action to cause them to crush the material between them and the wall of the pan.

3. A multiple and rotatable stamp mill for reducing or crushing rock and other materials, including a pan of conical internal shape in its upper portion, of cylindrical internal shape in its intermediate portion and of inverted conical internal shape in its lower portion, and provided with an upper central opening, means for rotating said pan at a high speed about a vertical axis, a plurality of crushing elements having wedge-shaped crushing heads and radially arranged within the pan and extending outwardly to near the wall thereof and rotated by frictional contact with the material in the pan, a central vertically reciprocating element to which the inner end portions of said crushing element are hingedly connected, means for hingedly connecting the crushing elements to the vertically reciprocating element, and means for reciprocating said vertically reciprocating element; so that the crushing elements have a toggle crushing action imparted to them by the vertically reciprocating element to cause them to move alternately upwards and downwards to crush the rock or material between them and the upper conical and lower inverted conical faces of the internal wall of the pan, as well as to move outwardly to exert substantially horizontal crushing pressure to crush the material between their extremities and the cylindrical intermediate portion of the internal wall of the pan.

4. A multiple and rotatable stamp mill for reducing or crushing rock and other materials, including a pan having a bottom and a peripheral wall and a hollow downwardly directed extension, power drive means for rotating said pan at a high speed about a vertical axis, a plurality of crushing elements radially arranged within said pan and extending outwardly to near the peripheral wall thereof, and rotated by contact with the material therein, between which elements and the peripheral wall the material is crushed, a central vertically reciprocating shaft mounted so as to be freely rotatable and journalled within said hollow downwardly directed pan extension, means for reciprocating said shaft, and pivotal connections between the central shaft and the inner end portions of the crushing elements which permit of vertical movement of the latter about their pivots, so that said crushing elements have a toggle crushing action imparted to them to cause them to crush the material between their outer end portions and the internal wall of the pan.

5. A multiple and rotatable stamp mill for reducing or crushing rock and other materials, including a pan having a bottom portion and a peripheral wall, means for rotating said pan at a high speed about a vertical axis, a plurality of crushing elements radially arranged within the pan, extending outwardly to near the wall thereof and rotated by frictional contact with the material in the pan, a central vertically reciprocating element, means for reciprocating said central element, means for pivotally connecting the crushing elements to the central vertically reciprocating element so that said pivots are reciprocated vertically and the outer and crushing ends of the crushing elements are moved inwards and outwards with a toggle crushing action to cause them to crush the material between them and the wall of the pan, and means for resiliently supporting the crushing elements in a substantially horizontal position in the pan.

6. A multiple and rotatable stamp mill for reducing or crushing rock and other materials, including a pan having a bottom portion and a peripheral wall, means for rotating said pan at a high speed about a vertical axis, a plurality of crushing elements radially arranged within the pan, extending outwardly to near the wall thereof and rotated by frictional contact with the material in the pan, a central vertically reciprocating element, means for reciprocating said central element, means for pivotally connecting the crushing elements to the central vertically reciprocating element so that said pivots are reciprocated vertically and the outer and crushing ends of the crushing elements are moved inwards and outwards with a toggle crushing action to cause them to crush the material between them and the wall of the pan, and means for resiliently supporting the crushing elements in a substantially horizontal position in the pan, including a spider arms structure carried by the central element above the crushing elements and tension springs connecting the arms of said structure to the crushing elements.

GABRIEL CHRISTIAAN ERASMUS KEET.

REFERENCES CITED

The following references are of record in the file of this patent:

UNITED STATES PATENTS

| Number | Name | Date |
| --- | --- | --- |
| 918,014 | Cooper | Apr. 13, 1909 |
| 2,017,598 | Keet | Oct. 15, 1935 |

FOREIGN PATENTS

| Number | Country | Date |
| --- | --- | --- |
| 99,284 | Germany | Sept. 7, 1898 |